US009132542B2

(12) United States Patent
Lau et al.

(10) Patent No.: US 9,132,542 B2
(45) Date of Patent: Sep. 15, 2015

(54) POWER TOOL

(75) Inventors: James Ching Sik Lau, Hong Kong (CN); Duncan Yiu Lung Wong, Hong Kong (CN); Chang Lin Jin, Shenzhen (CN); Aloys J. Liu, Shenzhen (CN)

(73) Assignee: Johnson Electric S.A., La Chaux-de-Fonds (CH)

(*) Notice: Subject to any disclaimer, the term of this patent is extended or adjusted under 35 U.S.C. 154(b) by 439 days.

(21) Appl. No.: 12/412,833

(22) Filed: Mar. 27, 2009

(65) Prior Publication Data

US 2009/0245958 A1 Oct. 1, 2009

(30) Foreign Application Priority Data

Mar. 28, 2008 (CN) .......................... 2008 1 0066264

(51) Int. Cl.
*B23B 45/02* (2006.01)
*B25F 5/00* (2006.01)

(52) U.S. Cl.
CPC ............. *B25F 5/008* (2013.01); *Y10T 408/655* (2015.01)

(58) Field of Classification Search
USPC ................... 173/48, 117, 170, 171, 216, 217; 310/47, 50, 64
See application file for complete search history.

(56) References Cited

U.S. PATENT DOCUMENTS

| | | | | |
|---|---|---|---|---|
| 3,304,051 | A * | 2/1967 | Thomas | 415/80 |
| 6,123,158 | A * | 9/2000 | Steffen | 173/217 |
| 6,127,751 | A * | 10/2000 | Kristen et al. | 310/50 |
| 6,263,980 | B1 * | 7/2001 | Wadge | 173/217 |
| 6,528,921 | B1 * | 3/2003 | Nakane | 310/239 |
| 7,056,616 | B2 | 6/2006 | Moores, Jr. et al. | |
| 7,786,627 | B2 | 8/2010 | Riedl | |
| 2003/0030984 | A1 | 2/2003 | Fung | |
| 2004/0175610 | A1 * | 9/2004 | Moores et al. | 429/120 |
| 2004/0226969 | A1 * | 11/2004 | Shew | 222/333 |
| 2004/0263008 | A1 * | 12/2004 | Voigt et al. | 310/58 |
| 2005/0034883 | A1 | 2/2005 | Yamada et al. | |
| 2005/0202310 | A1 * | 9/2005 | Yahnker et al. | 429/62 |
| 2006/0222930 | A1 | 10/2006 | Aradachi et al. | |
| 2006/0255756 | A1 * | 11/2006 | Iwata et al. | 318/254 |
| 2006/0290213 | A1 * | 12/2006 | Furui et al. | 310/58 |
| 2007/0236177 | A1 * | 10/2007 | Phillips et al. | 320/115 |

FOREIGN PATENT DOCUMENTS

| | | | |
|---|---|---|---|
| CN | 1494994 | | 5/2004 |
| CN | 1974140 | A | 6/2007 |
| JP | H 11-288744 | A | 10/1999 |
| JP | 2001-143678 | A | 5/2001 |
| JP | 2001-328080 | A | 11/2001 |
| JP | 2002-127047 | A | 5/2002 |
| JP | 2006-315121 | A | 11/2006 |
| JP | 2006-333587 | A | 12/2006 |
| JP | 2007-090468 | A | 4/2007 |

(Continued)

*Primary Examiner* — Nathaniel Chukwurah
(74) *Attorney, Agent, or Firm* — Muncy, Geissler, Olds & Lowe, P.C.

(57) ABSTRACT

A power tool has a handle and a body. The handle is provided with a battery. A motor is fixed inside a shell of the tool. An impeller is driven by the motor to create an air current to cool the motor and the battery. A plurality of air outlets are formed in the shell at a position corresponding to the impeller. An air current channel is formed inside the handle and the body and connected to the environment via holes in an enclosure of the battery. A part of the air current passes through the air current channel to cool the battery before reaching the motor.

10 Claims, 6 Drawing Sheets

(56) References Cited

FOREIGN PATENT DOCUMENTS

| | | | |
|---|---|---|---|
| JP | 2008-290236 | A | 12/2008 |
| JP | 2009-000779 | A | 1/2009 |
| WO | WO-2005/086851 | A2 | 9/2005 |

* cited by examiner

POWER TOOL

CROSS REFERENCE TO RELATED APPLICATIONS

This non-provisional patent application claims priority under 35 U.S.C. § 119(a) from Patent Application No. CN200810066264.1 filed in The People's Republic of China on Mar. 28, 2008, the disclosure of which is incorporated herein by reference.

FIELD OF THE INVENTION

This invention relates to a power tool and in particular, to an electric drill having a cooling system.

BACKGROUND OF THE INVENTION

In the conventional art, the technology of electric drills is getting gradually mature. As shown in FIG. 4A and FIG. 4B, the electric drill of conventional art commonly comprises a handle 1, a body 2 and a drill chuck 3. The handle 1 is provided with a battery 4 at one end of it, and provided with a switch 5 inside of it. The body 2 is provided inside with a motor 6 and an impeller 7 fixed to the rotational axle or shaft of the motor 6. The impeller 7 rotates with the motor 6 to produce an air current to cool the motor 6. The air current enters the body 2 through air inlets 8 and discharges through air outlets 9.

However, during the continuous use of the electric drill, the battery 4 and switch 5 of the electric drill will both produce heat. With longer continuous use, more heat is produced. If the cumulated heat is not dissipated in time, the service life of the battery 4 and switch 5 will be seriously influenced.

SUMMARY OF THE INVENTION

To solve the above said technical problems, the present invention provides a power tool comprising a handle and a body, one end of the handle being provided with a battery, the body comprising a shell, a motor fixed in the shell and an impeller fixed to an axle of the motor, the shell being provided with a plurality of air outlets at a position corresponding to the impeller, the impeller being able to rotate with the axle of the motor to produce an air current to cool the motor, wherein an enclosure of the battery is provided with a plurality of through holes; an air current channel is formed inside the handle and the body, and connected to the environment via the through holes of the enclosure of the battery; a part of the cooling air current passes through the air current channel to cool the battery before getting to the motor.

A further improvement of the present invention is that, the electric drill further comprises a switch provided at the handle and a heat dissipating device fixed to the switch absorbing heat produced by the switch; the heat dissipating device is located at least partially within the air current channel, so that the air current can take away the heat absorbed by the heat dissipating device.

Preferably, the heat dissipating device comprises a base in contact with the switch and a plurality of fins extending from the base, and any two adjacent fins are spaced from each other to form a passageway there between.

Preferably, a vacuum pump is located at the air current channel.

Preferably, the motor has a housing and the impeller has a flange, the flange cooperating with an inner side of the housing to form a partition shield to prevent the air current at one side of the partition shield adjacent to the air outlets from flowing to the air channel.

Alternatively, a circular projecting rib is formed on an inner surface of the shell, and the impeller has a flange, the flange cooperating with the circular projecting rib to form a partition shield to prevent the air current at one side of the partition shield adjacent to the air outlets from flowing into the air channel.

Preferably, a plurality of air inlets are provided in the shell at a position adjacent to the motor.

Preferably, the motor comprises an armature and a number of brushes; the impeller is axially located between the armature and the brushes; the air current entering from the air inlets of the shell can cool the armature, and the air current entering from the through holes of the enclosure of the battery and passing through the air current channel can cool the brushes.

Preferably, the power tool is an electric drill and has a drill chuck.

The embodiments illustrated in the present invention have the beneficial effects of that a part of the air current enters from the through holes of the battery enclosure and passes through the air current channel, this part of the air current can cool the battery and the switch before cooling the motor, so as to prevent the battery and the switch from overheating and shortening their service life.

BRIEF DESCRIPTION OF THE DRAWINGS

A preferred embodiment of the invention will now be described, by way of example only, with reference to figures of the accompanying drawings, in which.

Figure 1A:
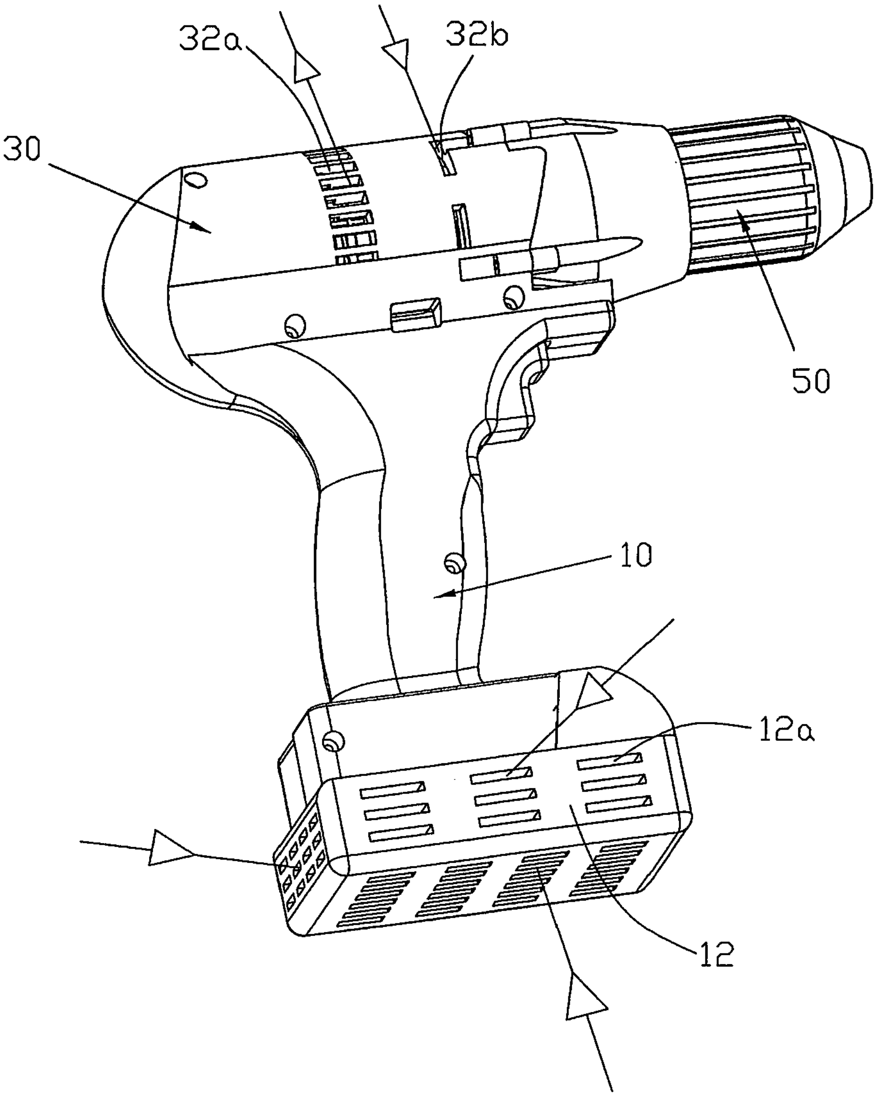
FIG. 1A is an isometric view of an electric drill according to a first embodiment of the present invention.
Figure 1B:
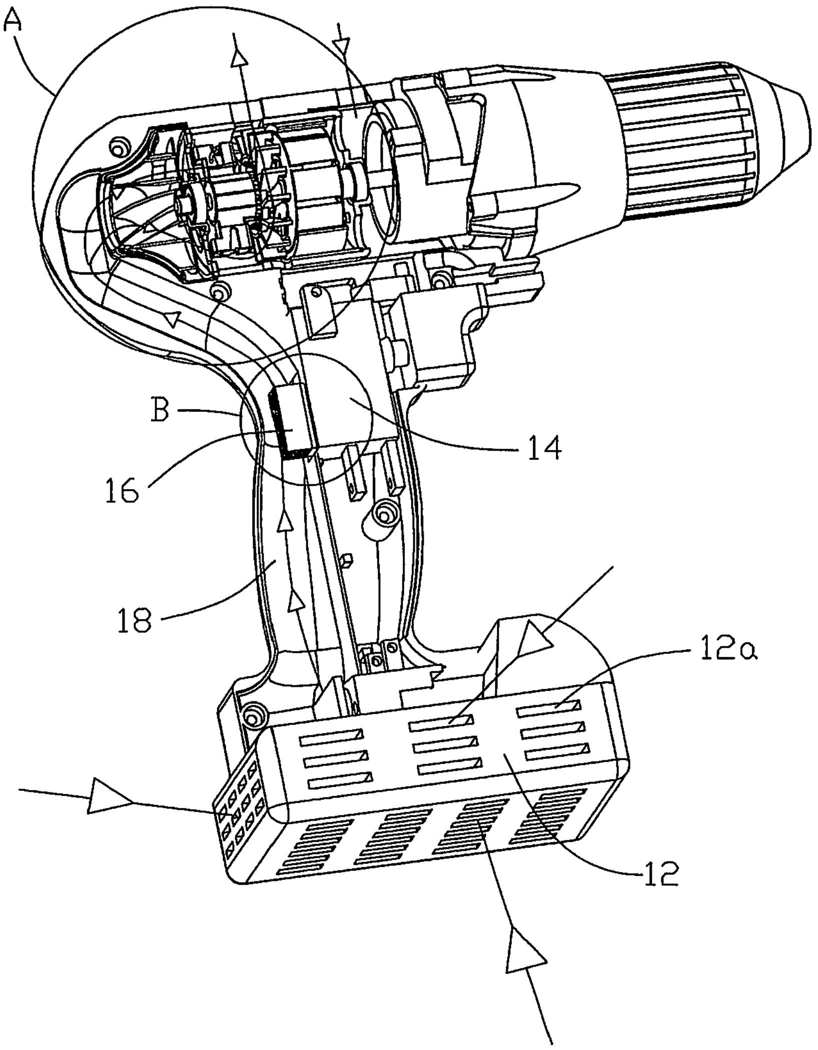
FIG. 1B is a sectional view of the electric drill of FIG. 1A.
Figure 1C:
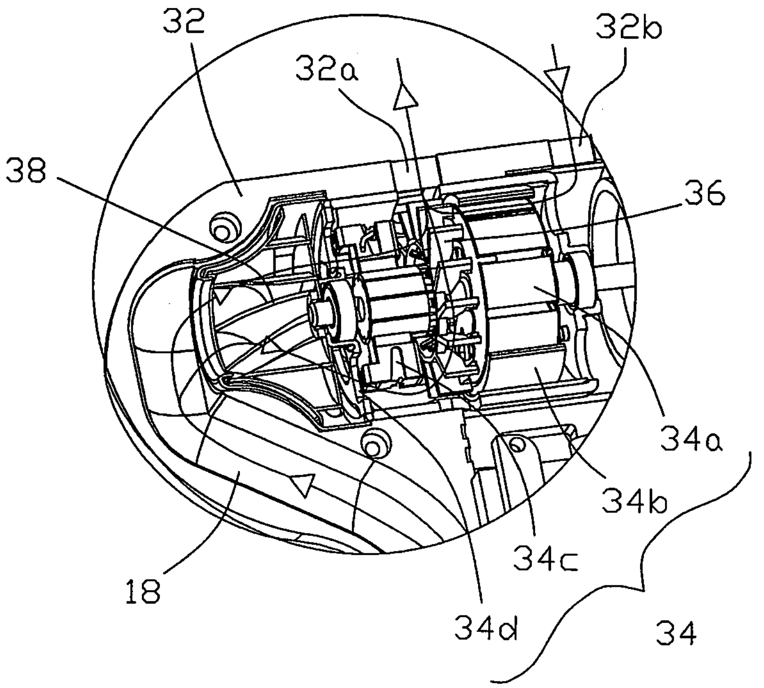
FIG. 1C is an enlarged schematic view of the part in circle A of FIG. 1B.
Figure 1D:
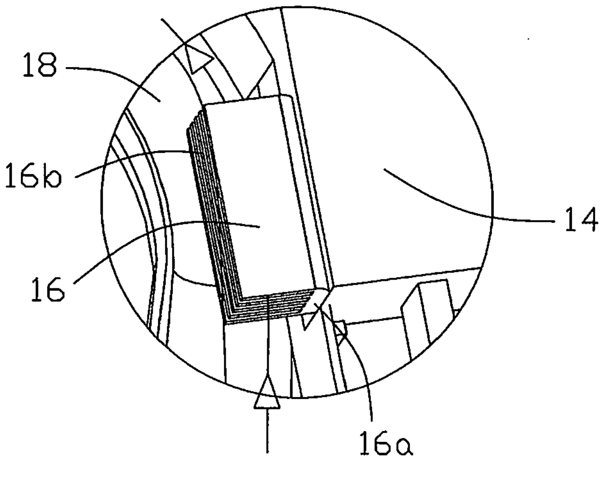
FIG. 1D is an enlarged schematic view of the part in circle B of FIG. 1B.

In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale.

DETAILED DESCRIPTION OF THE PREFERRED EMBODIMENTS

The technical problem to be solved, the technical solution and the beneficial effects of the present invention are best understood from the following detailed description of preferred embodiments, with reference to the accompanying figures. The preferred embodiments described here are, of course, merely examples to explain the invention and are not intended to limit the present invention.

Referring to FIG. 1A to FIG. 1D, an electric drill according to the first embodiment of the present invention is shown. The electric drill has a handle 10, a body 30 and a drill chuck 50. One end of the handle 10 is provided with a battery 12, and the inner side of the part adjacent to the body 30 is provided with a switch 14, with a heat dissipating device 16 fixed to the switch 14 to absorb the heat produced by the switch 14. The battery 12 has a square shape with a plurality of through holes 12*a* provided in an enclosure thereof. The heat dissipating device 16 comprises a base 16*a* in contact with the switch 14 and a plurality of fins 16*b* extending from the base 16*a*. The fins 16*b* are parallel and spaced from each other with a certain spacing. An air current channel 18 is formed at the handle 10 and the inner side of the body 30, connected to the through holes 12*a* of the enclosure of the battery 12, and the heat dissipating device 16 is located, at least partially, in the air current channel 18. The orientation of the fins 16*b* is basically the same as that of the air current channel 18.

The body 30 comprises a shell 32, a motor 34 fixed in the shell 32, an impeller 36 fixed to the axle or shaft of the motor and a vacuum pump 38. The shell 32 is provided with a plurality of air outlets 32*a* at a position corresponding to the impeller 36, and the shell 32 is provided with a plurality of air inlets 32*b* adjacent to the motor 34. The motor has a housing accommodating a stator 34*b*, an armature 34*a* with a gap being provided between the armature 34*a* and the motor stator 34*b*, a commutator and brushes 34*c* in sliding contact with the commutator and an end cap closing one end of the housing and supporting the brushes 34*c*. The impeller 36 comprises a plurality of vanes rotating with the axle of the motor to produce an air current to cool the motor 34, and as shown by the direction of the arrowheads in the figures, a part of the air current enters from the air inlets 32*b* and passes through the gap between the armature 34*a* and the stator 34*b* to get to the impeller 36, and another part of the air current enters from the through holes 12*a* at the enclosure of the battery 12 and passes through the air current channel 18, through the vacuum pump 38, through the through holes 34*d* in the end cap of the motor 34 to get to the impeller 36. The air current entering from the air inlets 32*b* can cool the armature 34*a*, and the air current entering from the battery through holes 12*a* can cool the battery 12, the switch 14 (via the heat dissipating device 16) and the brush 34*c*, then the air current is discharged from the body 30 through the air outlets 32*a* of the shell 32 by the impeller 36.

Figure 2A:
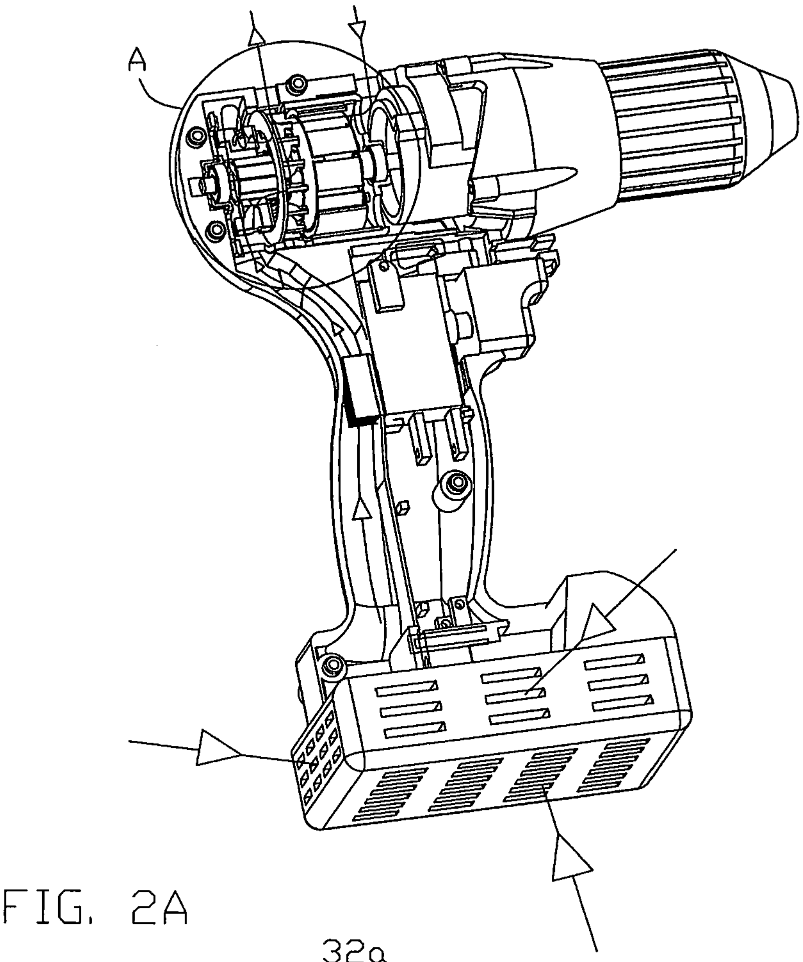
FIG. 2A is a sectional view similar to FIG. 1B of an electric drill according to a second embodiment of the present invention.
Figure 2B:
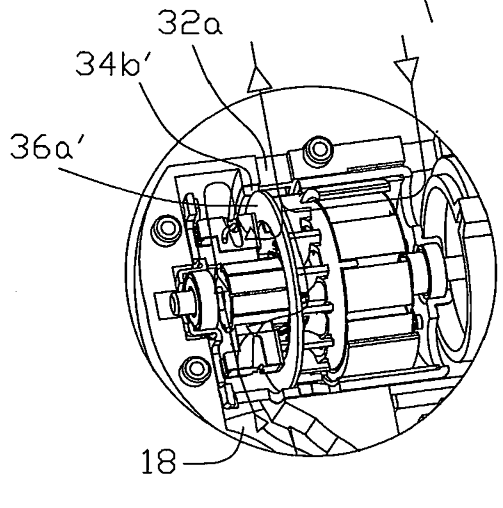
FIG. 2B is an enlarged schematic view of the part in circle A of FIG. 2A.

FIG. 2A and FIG. 2B show an electric drill according to a second embodiment of the present invention, which is similar to the electric drill of the first embodiment, the difference being that in the present embodiment the vacuum pump 38 is omitted, so as to decrease the size of the electric drill. Also the impeller has a round flange 36*a*', with the flange 36*a*' cooperating with an inner side or surface portion of the motor housing 34*b*' to form a partition shield along the direction of the axis of the motor, to prevent the air current at the partition shield adjacent to side of the air outlets 32*a* to back flow into the air channel 18.

Figure 3A:
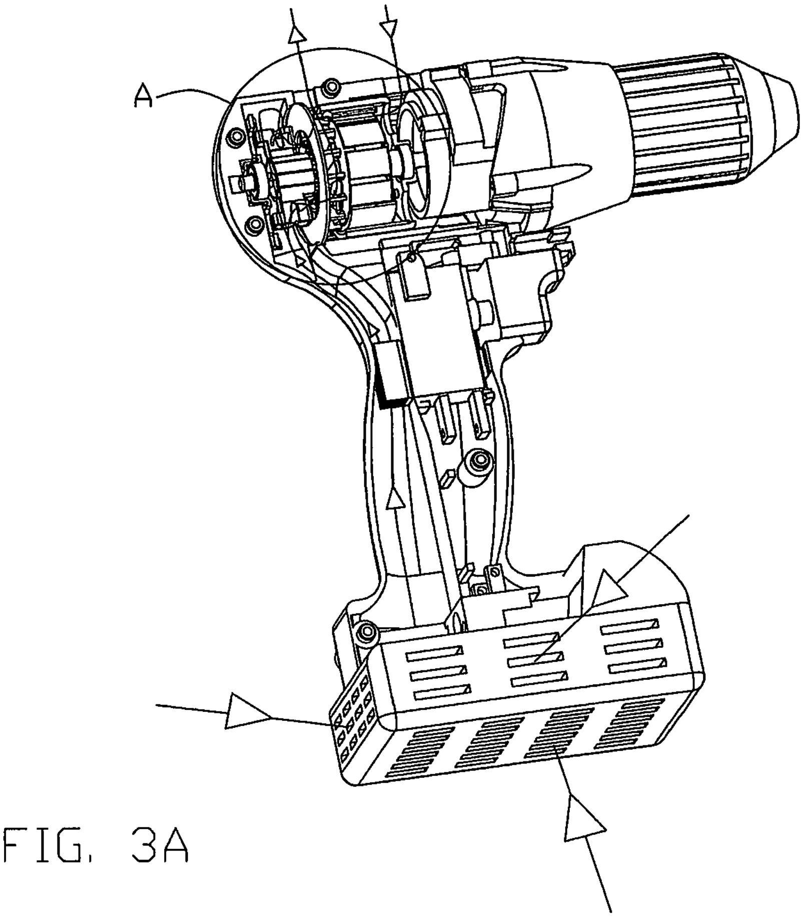
FIG. 3A is a sectional view similar to FIG. 1B of an electric drill according to another embodiment of the present invention.
Figure 3B:
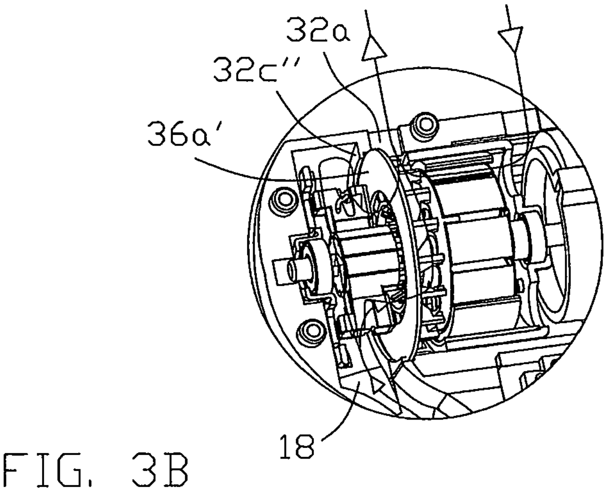
FIG. 3B is an enlarged schematic view of the part in circle A of FIG. 3A.
Figure 4A:
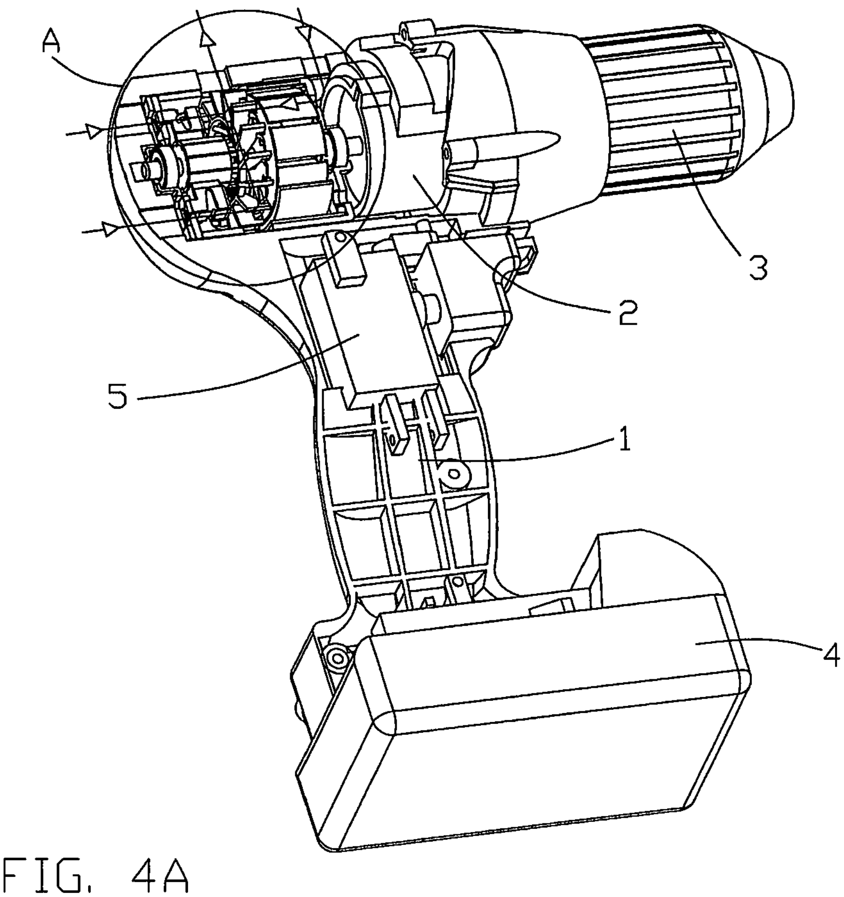
FIG. 4A is a sectional view of an electric drill of the prior art.
Figure 4B:
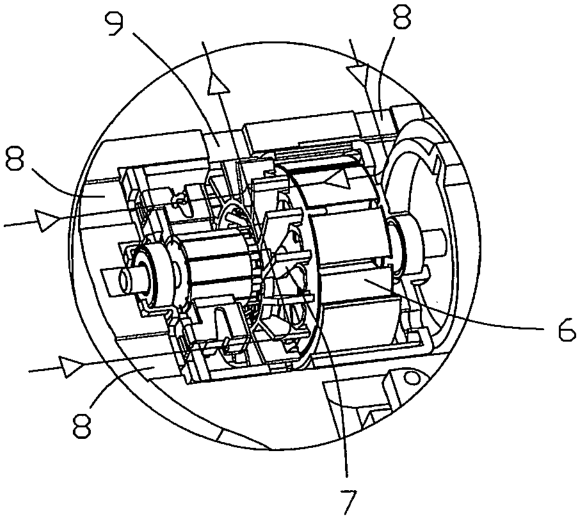
FIG. 4B is an enlarged schematic view of the part in circle A of FIG. 4A.

FIG. 3A and FIG. 3B show an electric drill according to another embodiment of the present invention, which is similar to the electric drill of the second embodiment, the difference being that a circular projecting rib 32*c*" is formed at the inner side of the shell of the body of the electric drill, with the flange 36*a*' of the impeller cooperating with the projecting rib 32*c*" to form a partition shield along the direction of the axis of the motor, to prevent air current at the partition shield adjacent to the side of the air outlets 32*a* to flow into the air channel 18.

In the embodiments of the present invention, a part of the cooling air current enters from the through holes 12*a* of the battery 12 and passes through the air current channel 18 to get to the impeller 36, and this part of air current entering can cool the battery 12 and the switch 14 before cooling the brush 34*c*, so as to prevent the battery 12 and the switch 14 from overheating to have influence on their service life.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A power tool comprising:

a handle having a first end, a second end, and an air current channel formed between the first and second ends;

an enclosure at the first end of said handle and having a plurality of through holes;

a battery disposed in said enclosure;

a shell connected to the second end of said handle, in communication with the air current channel in said handle, and having an air inlet and an air outlet;

a chuck connected to the shell, the air inlet located closer to the chuck than the air outlet;

a motor in said shell having a first end and a second end opposite to each other, the second end of said motor located closer to the air inlet of the shell than the first end of said motor, the air outlet being disposed between the air inlet and the first end of the motor; and an impeller mounted to an axle of said motor and disposed between the first and second ends of said motor, the impeller having a first axial end and a second axial end opposite to each other, and a plurality of vanes between said first and second axial ends, the vanes radially facing the outlet of the shell, wherein the plurality of vanes of said impeller rotating with the axle of said motor generates a first air current entering said enclosure via the plurality of through holes, past said battery and the air current channel in said handle, flowing through the first end of said motor in said shell, reaching the impeller from the first axial end thereof, and exiting said shell via the air outlet, and a second air current entering said shell via the air inlet, flowing through the second end of said motor, and then reaching the impeller from the second axial end thereof and exiting said shell via the air outlet.

2. The power tool of claim 1, further comprising a switch provided inside the handle and a heat dissipating device fixed to the switch for absorbing the heat produced by the switch; the heat dissipating device is located at the air current channel, such that the first air current is capable of cooling the heat dissipating device.

3. The power tool of claim 2, wherein the heat dissipating device comprises a base in contact with the switch and a plurality of fins extending from the base in a direction perpendicular to the air current channel, and any two adjacent fins are spaced from each other to form a passageway there between, the passageway parallel to the air current channel to allow the first air current to pass through the passageway in a direction parallel to the air current channel.

4. The power tool of claim 1, further comprising a vacuum pump adjacent said motor, the first air current passing through the vacuum pump before reaching the first end of said motor.

5. The power tool of claim 1, wherein the motor has a housing, and the impeller has a flange, the flange cooperating with an inner side of the housing to form a partition shield to prevent the air current at one side of the partition shield adjacent to the air outlet from flowing to an opposite side of the partition shield away from the air outlet.

6. The power tool of claim 1, wherein a circular projecting rib is formed on an inner surface of the shell, and the impeller has a flange, the flange cooperating with the circular projecting rib to form a partition shield to prevent the air current at one side of the partition shield adjacent to the air outlet from flowing back to an opposite side of the partition shield away from the air outlet.

7. The power tool of claim 1, wherein the motor comprises an armature and a number of brushes; the impeller is axially located between the armature and the brushes; the second air current entering from the air inlet of the shell can cool the armature, and the first air current entering from the through holes of the enclosure and passing through the air current channel can cool the brushes.

8. The power tool of claim 1, wherein the power tool is an electric drill and has a drill chuck.

9. A power tool comprising:

a handle, one end of the handle being provided with an enclosure, the enclosure defining a plurality of through holes;

a battery disposed in said enclosure;

a body comprising a shell connected with the handle, the shell defining an air inlet;

a motor fixed in the shell, the motor having a first end and a second end opposite to each other; and an impeller fixed to an axle of the motor and disposed between the first and second ends of said motor, the impeller comprising a plurality of vanes which is rotatable with the axle of the motor to produce an air current to cool the motor, wherein:

the motor comprises an armature and a number of brushes, the impeller being axially located between the armature and the brushes;

the shell defines an air outlet at a position radially facing the impeller, the vanes of the impeller extending toward the air outlet in radial directions of the impeller, an air current channel is formed inside the handle and the body and connected to the through holes of the enclosure, a first part of the air current generated by the impeller fixed to the axle of the motor in the shell enters into the enclosure via the through holes of the enclosure in which the battery is disposed and passes through the air current channel before reaching the motor, said first part of the air current flowing from outside the enclosure, past the battery, the air current channel inside the handle and the brushes of the motor, and then to the impeller to thereafter exit the power tool via the outlet, and a second part of the air current enters from the air inlets of the shell and passes through the armature of the motor, and then to the impeller.

10. The power tool of claim 1, wherein the impeller is located between the first and second ends of said motor and radially faces the outlet of said shell.

* * * * *